US012437746B2

(12) United States Patent
Bonar et al.

(10) Patent No.: US 12,437,746 B2
(45) Date of Patent: Oct. 7, 2025

(54) REAL-TIME SYSTEM FOR SPOKEN NATURAL STYLISTIC CONVERSATIONS WITH LARGE LANGUAGE MODELS

(71) Applicant: MICROSOFT TECHNOLOGY LICENSING, LLC, Redmond, WA (US)

(72) Inventors: Adrian Wyatt Bonar, Seattle, WA (US); Jennifer Fox, Seattle, WA (US); Nicole E. Berdy, Cambridge, MA (US); Mollie Munoz, Redmond, WA (US); Shawn Callegari, Redmond, WA (US); Devis Lucato, Redmond, WA (US); Ryan H. Volum, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 18/132,356

(22) Filed: Apr. 7, 2023

(65) Prior Publication Data
US 2024/0169974 A1 May 23, 2024

Related U.S. Application Data

(60) Provisional application No. 63/427,079, filed on Nov. 21, 2022.

(51) Int. Cl.
*G10L 13/10* (2013.01)
*G10L 15/26* (2006.01)
(Continued)

(52) U.S. Cl.
CPC .............. *G10L 13/10* (2013.01); *G10L 15/26* (2013.01); *G10L 13/02* (2013.01); *G10L 13/08* (2013.01);
(Continued)

(58) Field of Classification Search
CPC .............. G10L 13/02; G10L 2015/225; G10L 15/1815; G06F 40/10; G06F 40/30
See application file for complete search history.

(56) References Cited

U.S. PATENT DOCUMENTS 11,289,082 B1 * 3/2022 Lacy ....................... G10L 15/02
2007/0208569 A1 9/2007 Subramanian et al.
(Continued)

OTHER PUBLICATIONS

International Search Report and Written Opinion received for PCT Application No. PCT/US2023/035462, mailed on Feb. 6, 2024, 11 Pages.
(Continued)

*Primary Examiner* — Feng-Tzer Tzeng
(74) *Attorney, Agent, or Firm* — Scott Y. Shigeta; Newport IP, LLC (57) ABSTRACT

The techniques disclosed herein enable systems for spoken natural stylistic conversations with large language models. In contrast to many existing modalities for interacting with large language models that are limited to text, the techniques presented herein enable users to carry a fully spoken conversation with a large language model. This is accomplished by converting a user speech audio input to text and utilizing a prompt engine to analyze a sentiment expressed by the user. A large language model, having been trained on example conversations, by generating a text response as well as a style cue to express emotion in response to the sentiment expressed by speech audio input. A text-to-speech engine can subsequently interpret the text response and style cue to generate an audio output which emulates the sensation of human conversation.

20 Claims, 7 Drawing Sheets

(51) Int. Cl.
  *G10L 13/02* (2013.01)
  *G10L 13/08* (2013.01)
  *G10L 15/18* (2013.01)
  *G10L 15/22* (2006.01)
  *G10L 25/63* (2013.01)

(52) U.S. Cl.
  CPC .... *G10L 2013/083* (2013.01); *G10L 15/1815* (2013.01); *G10L 2015/225* (2013.01); *G10L 25/63* (2013.01)

(56) References Cited

U.S. PATENT DOCUMENTS

| | | | |
|---|---|---|---|
| 2014/0114648 A1* | 4/2014 | Eggink | G06F 40/30 704/9 |
| 2016/0063993 A1 | 3/2016 | Dolan et al. | |
| 2019/0379791 A1* | 12/2019 | Winter | H04M 3/5183 |
| 2020/0193264 A1* | 6/2020 | Zavesky | G06N 20/00 |
| 2021/0216723 A1* | 7/2021 | Zhang | G06F 18/214 |

OTHER PUBLICATIONS

International Preliminary Report Patentability received for PCT Application No. PCT/US23/035462, mailed on Jun. 5, 2025, 06 Pages.

* cited by examiner

```
┌─────────────────────────────────────────────────────┐
│  CONFIGURE A LARGE LANGUAGE MODEL WITH A CONVERSATIONAL │
│    PROFILE COMPRISING TRAINING DATA AND SENTIMENT SET   │
│                         502                             │
└─────────────────────────────────────────────────────┘
                            │
┌─────────────────────────────────────────────────────┐
│     RECEIVE USER INPUT COMPRISING A SPEECH AUDIO INPUT  │
│                         504                             │
└─────────────────────────────────────────────────────┘
                            │
┌─────────────────────────────────────────────────────┐
│   CONVERT USER INPUT INTO A TEXT TRANSLATION OF THE SPEECH │
│                      AUDIO INPUT                        │
│                         506                             │
└─────────────────────────────────────────────────────┘
                            │
┌─────────────────────────────────────────────────────┐
│    ANALYZE THE TEXT TRANSLATION OF THE SPEECH AUDIO INPUT │
│   USING PROMPT ENGINE TO DETERMINE A SENTIMENT OF THE USER │
│                         INPUT                           │
│                         508                             │
└─────────────────────────────────────────────────────┘
                            │
┌─────────────────────────────────────────────────────┐
│    GENERATE A TEXT RESPONSE TO THE USER INPUT BASED ON THE │
│   TRAINING DATA AND THE TEXT TRANSLATION OF THE SPEECH AUDIO │
│          INPUT USING THE LARGE LANGUAGE MODEL           │
│                         510                             │
└─────────────────────────────────────────────────────┘
                            │
┌─────────────────────────────────────────────────────┐
│    SELECT SENTIMENT FROM THE CONVERSATIONAL PROFILE TO  │
│   GENERATE A STYLE CUE BASED ON THE SENTIMENT OF THE USER │
│          INPUT USING THE LARGE LANGUAGE MODEL           │
│                         512                             │
└─────────────────────────────────────────────────────┘
                            │
┌─────────────────────────────────────────────────────┐
│     TRANSLATE THE TEXT RESPONSE AND THE STYLE CUE TO    │
│   GENERATE AN AUDIO OUTPUT RESPONSE TO THE USER INPUT   │
│                         514                             │
└─────────────────────────────────────────────────────┘
```

REAL-TIME SYSTEM FOR SPOKEN NATURAL STYLISTIC CONVERSATIONS WITH LARGE LANGUAGE MODELS

PRIORITY APPLICATION

This application claims the benefit of and priority to U.S. Provisional Application No. 63/427,079, filed Nov. 21, 2022, the entire contents of which are incorporated herein by reference.

BACKGROUND

Recent innovations have seen the rapid growth in the capability and sophistication of artificial intelligence (AI) software applications. For instance, large-language models have seen widespread adoption due to their diverse processing capabilities in vision, speech, language, and decision making. Unlike other AI models such as recurrent neural networks and long short-term memory (LSTM) models, large language AI models make use of a native self-attention mechanism to identify vague contexts and even synthesize new content (e.g., images, music). Consequently, large language models can be highly complex and computing intensive. In some instances, large language models can comprise billions of individual parameters. To meet this demand, many organizations that provide large-scale computing infrastructure, such as cloud computing, offer AI platforms tailored to enable training and deployment of large language models.

Accordingly, external users can interact with large language models by providing prompts which are then parsed and analyzed by the large language model to generate an output. For instance, a large language model that is configured for image generation can receive a descriptive prompt create an output image depicting the prompt. In another example, a large language model that is configured for text completion can receive a text input and generate output text that matches the prompt syntactically and contextually.

Unfortunately, existing modalities for interacting with large language models are often limited to text. That is, a user provides a plaintext prompt through an input device such as a keyboard. To enhance the user experience, enable broader applications, and empower more users to take advantage of large language models, there is a need for additional options for interfacing with large language models.

SUMMARY

The techniques described herein enhance systems for interacting with large language models by introducing a natural language interface to enable natural spoken conversations. This is accomplished by utilizing a prompt engine for analyzing a user speech input to determine sentiment (e.g., friendly, excited). The sentiment is accordingly used to inform responses from the large language model within a conversational context. In addition, responses from the large language model can include style cues to enable the large language model to express a sentiment and provide a lifelike conversational experience.

As mentioned above, existing options for user interaction with large language models are largely limited to text inputs (e.g., via a keyboard). Consequently, this restricts the potential applications of large language models as well as the number users who are able to take advantage of them. For instance, a language model that is only configured for text input may cause users who do not have a technical background to feel intimidated or confused. Moreover, potential uses of a text-only large language model can also be restricted to text-based contexts such as text completion or demonstration applications such as image generation.

In contrast, the techniques discussed herein enable a user to carry a natural spoken word conversation with a large language model. In various examples, a large language model can be configured with a conversational profile which can include training data (e.g., example conversations) as well as a set of sentiments to express when responding to a user input. Upon receiving a speech audio input from a user, a speech-to-text translation can be generated. The speech-to-text translation of the speech audio input can then be analyzed by a prompt engine to determine a sentiment of the user input.

The speech-to-text translation and the user sentiment can subsequently be used by the large language model to formulate a text response subject to the training data of the conversational profile. In addition, the large language model can select an appropriate sentiment to attach to the text response based on the sentiment determined from the user input. In various examples, the selected sentiment can also be referred to as a style cue. Accordingly, the text response and the style cue can then be provided to a text-to-speech engine to generate an audio output response to the user's speech audio input. The style cue can be interpreted by the text-to-speech engine to add inflection and emotion to the audio output to express the sentiment selected by the large language model. In this way, a user can be immersed in a conversation that feels natural and lifelike.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
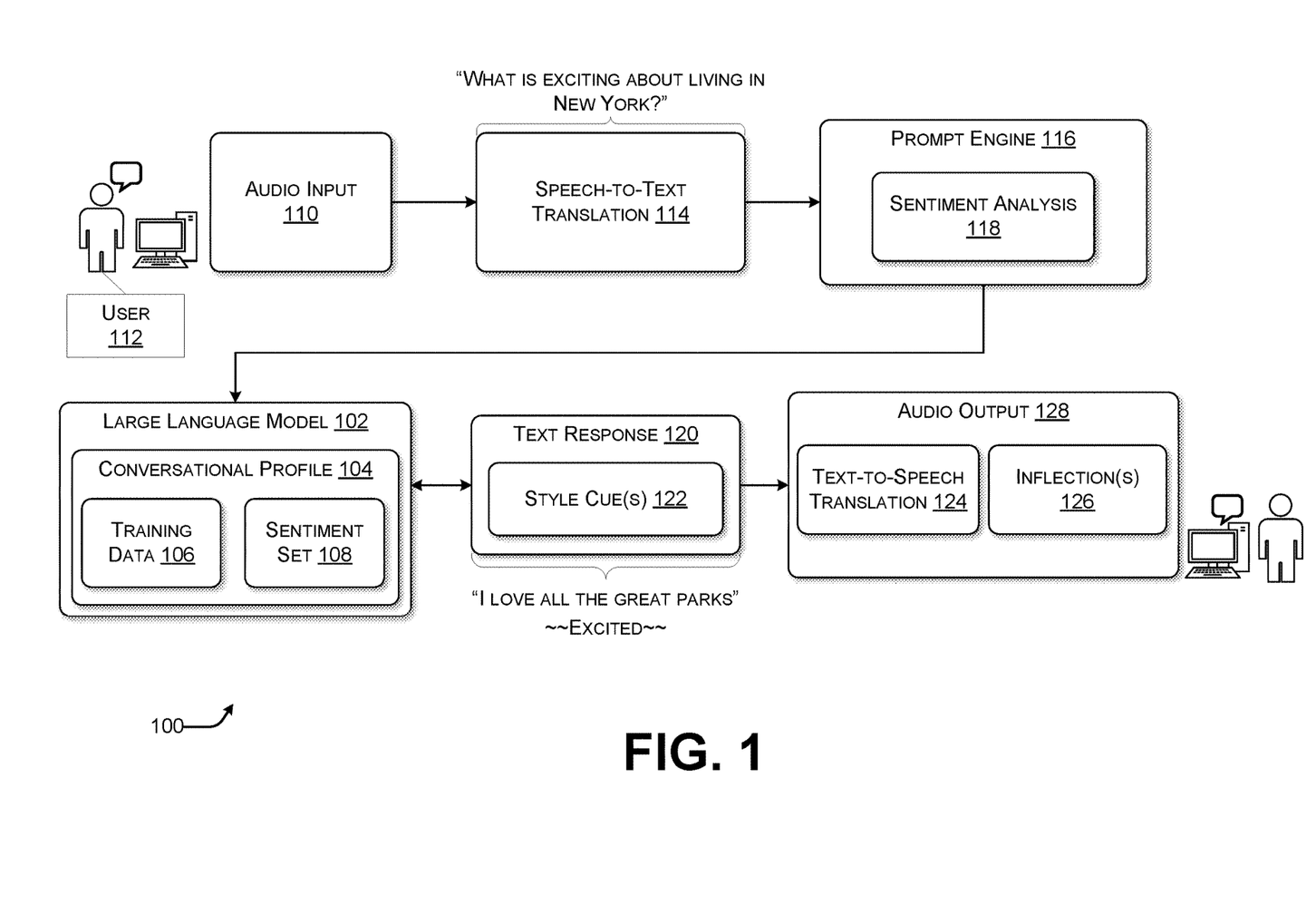
FIG. 1 is a block diagram of a system for enabling spoken natural stylistic conversations with a large language model.

FIG. 1 illustrates a system 100 that provides a natural language interface for spoken conversation with a large language model 102. This is enabled by configuring the large language model 102 with a conversational profile 104. In various examples, the conversational profile 104 can include training data 106 that can be analyzed by the large language model 102 to inform responses to user input. For instance, the training data 106 can include example conversations that demonstrate different conversational contexts, emotions, and syntax. From an analysis of the training data 106 the large language model 102 can effectively learn how to respond to new inputs and carry on a conversation.

In addition, the conversational profile 104 can include a sentiment set 108. The sentiment set 108 can define various emotions which the large language model 102 can select from to appropriately respond to an input and create an engaging conversation. In some examples, the sentiment set 108 can be broad, enabling the large language model 102 to express a wide range of emotions (e.g., happy, sad, excited). Conversely, the sentiment set 108 can be limited to contextually appropriate emotions. For instance, it would be inappropriate for a large language model 102 in a customer service context to be able to express anger.

Once configured with the conversation profile 104, the large language model 102 is ready to receive a speech audio input 110 from a user 112. The audio input 110 can subsequently be converted to a speech-to-text translation 114 where the spoken language of the user 112 is transcribed as text. This conversion can occur at regular intervals (e.g., once every five seconds). Alternatively, the system 100 can continuously gather the audio input 110 as the user 112 speaks and wait to generate the speech-to-text translation 114 until the user pauses and/or stops speaking.

The speech-to-text translation 114 can then be processed by a prompt engine 116 to produce a sentiment analysis 118. In this way, the prompt engine can parse what the user 112 is literally saying as well as sentiment and emotion implied in the audio input 110. For instance, the sentiment analysis 118 can be based in part on the word choice in the speech-to-text translation 114. In addition, subtleties such as inflections, tone of voice, and speaking volume can also be considered in the sentiment analysis 118.

Using the speech-to-text translation 114 and the sentiment analysis 118, the large language model 102 can formulate a text response 120 to the speech audio input 110. In various examples, the text response 120 is generated within the bounds of the pattern established by the training data 106. For instance, the training data 106 may cause the large language model 102 to tend towards politely worded text responses 120. In addition, the large language model 102 can select a sentiment from the sentiment set 108 to generate a style cue 122 based on the sentiment analysis 118. The style cue 122 can enable the large language model 102 to express emotions as configured by the conversational profile 104.

In a specific example, as shown in FIG. 1, a user 112 may ask the large language model 102 "what is exciting about living in New York?" Based on the speech-to-text translation 114, the sentiment analysis 118 can determine that the user 112 is expressing "excitement" and/or inquiring about something "exciting." In response, the large language model 102 can generate a text response 120 stating "I love all the great parks." In addition, the large language model 102 can generate a style cue 122 defining "~~excited~~" as shown.

The text response 120 including the style cue 122 are then converted into a text-to-speech translation 124 and an inflection 126 respectively to generate an audio output 128 which can be played to the user 112. It should be understood that any suitable method can be used to generate the audio output 128 such as a text-to-speech engine. For instance, the text-to-speech translation 124 can be a straightforward reading of the text response 120 by a text-to-speech engine while the inflection 126 can be an interpretation of the style cue 122 provided by the large language model 102 to express the emotion selected from sentiment set 108. In this way, the system 100 can carry a lifelike and immersive conversation to enhance the user experience.

In addition, the text response 120 and the style cue 122 can also be added to the training data 106 to further refine the conversational profile 104 of the large language model 102. This can be augmented by feedback from the user 112 regarding the quality of their conversation with the large language model 102. For example, a conversation that resulted in positive feedback from the user 112 can be stored in the training data 106 with an increased emphasis to promote similarly high-quality interactions. Conversely, a conversation that resulted in negative feedback from the user 112 can be stored in the training data 106 with a decreased emphasis to discourage low-quality interactions in the future.

Figure 2:
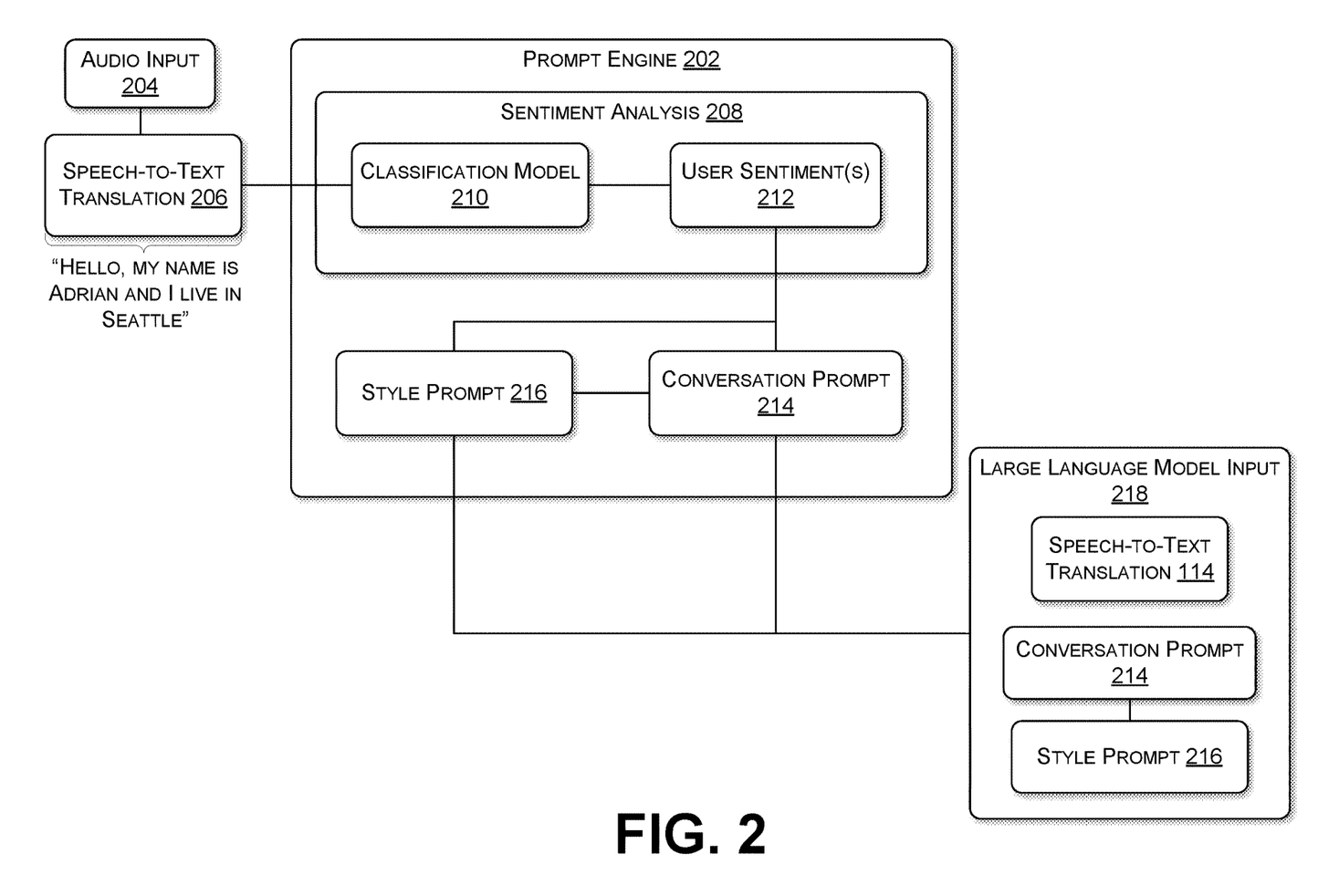
FIG. 2 is a block diagram of a prompt engine performing sentiment analysis and prompt engineering.

Turning now to FIG. 2, additional aspects and functionality of a prompt engine 202 are shown and described. As mentioned above, a user can provide a speech audio input 204 that can be converted into a speech-to-text translation 206. In the example shown in FIG. 2, the speech-to-text translation 206 can state "hello, my name is Adrian and I live in Seattle." Accordingly, the prompt engine 202 can perform a sentiment analysis 208 of the speech-to-text translation 206. In various examples, the sentiment analysis 208 may utilize a classification model 210 that can be configured to parse the speech-to-text translation 206 to determine a user sentiment 212. In various examples, the classification model 210 can be a machine learning model that is pre-trained to perform sentiment analysis 208 using a large corpus of labeled data. The classification model 210 can accordingly generate a ranked list of likely user sentiments 212 that are expressed by the audio input 204. Moreover, the machine learning model can be periodically retrained to improve accuracy over time. Alternatively, the classification model 210 can employ heuristics to determine likelihoods for various user sentiments 212. For example, the presence of certain words in the speech-to-text translation 206 can trigger a determination of various user sentiments 212.

Based on the user sentiment 212 determined by the sentiment analysis 208, the prompt engine 202 can accordingly generate a conversation prompt 214. In various examples, the conversation prompt 214 can be formatted as a natural language description of an intended behavior of a large language model. In a specific example, the conversation prompt can state "respond as someone who is friendly and good at conversation." It should be understood that the conversation prompt 214 can be formatted in any suitable manner to configure a large language model with an expected behavior. As will be discussed below, the large language model can generate outputs in accordance with the conversation prompt 214.

In addition, the conversation prompt 214 can be augmented by a style prompt 216 that can be generated based on the user sentiment 212 determined from the sentiment analysis 208 as well as the conversation prompt 214. For instance, the sentiment analysis 208 may determine, based on the speech-to-text translation 206, a positive and polite user sentiment 212. Moreover, the conversation prompt 214 can instruct a large language model to "respond as someone who is friendly and good at conversation." The style prompt 216 can reflect the conversation prompt 214 to emphasize that the large language model is to respond in a friendly manner. As will be elaborated upon below, while the conversation prompt can define how a large language model selects words and phrases for a response, the style prompt 216 can define how the large language model expresses selected sentiments and/or emotions.

In another example, the style prompt 216 can counter the conversation prompt 214 in response to a negative user sentiment 212. For instance, the speech-to-text translation 206 may express a rude user sentiment 212. However, the prompt engine 202 may maintain a conversation prompt 214 instructing the large language model to "respond as someone who is friendly and good at conversation." To appropriately respond to the rude user sentiment 212, the style prompt 216 may augment the conversation prompt 214 to cause the large language model to respond in a conciliatory and apologetic manner. In this way, the friendly nature of the conversation prompt 214 can be maintained while accounting for changeable user sentiments 212. Like the conversation prompt 214, the style prompt 216 can be similarly formatted as a natural language input, program code, or any suitable format for providing input to a large language model. The speech-to-text translation 206 of the audio input 204, the conversation prompt 214, and the style prompt 216 can be subsequently packaged by the prompt engine 202 as a large language model input 218.

Figure 3:
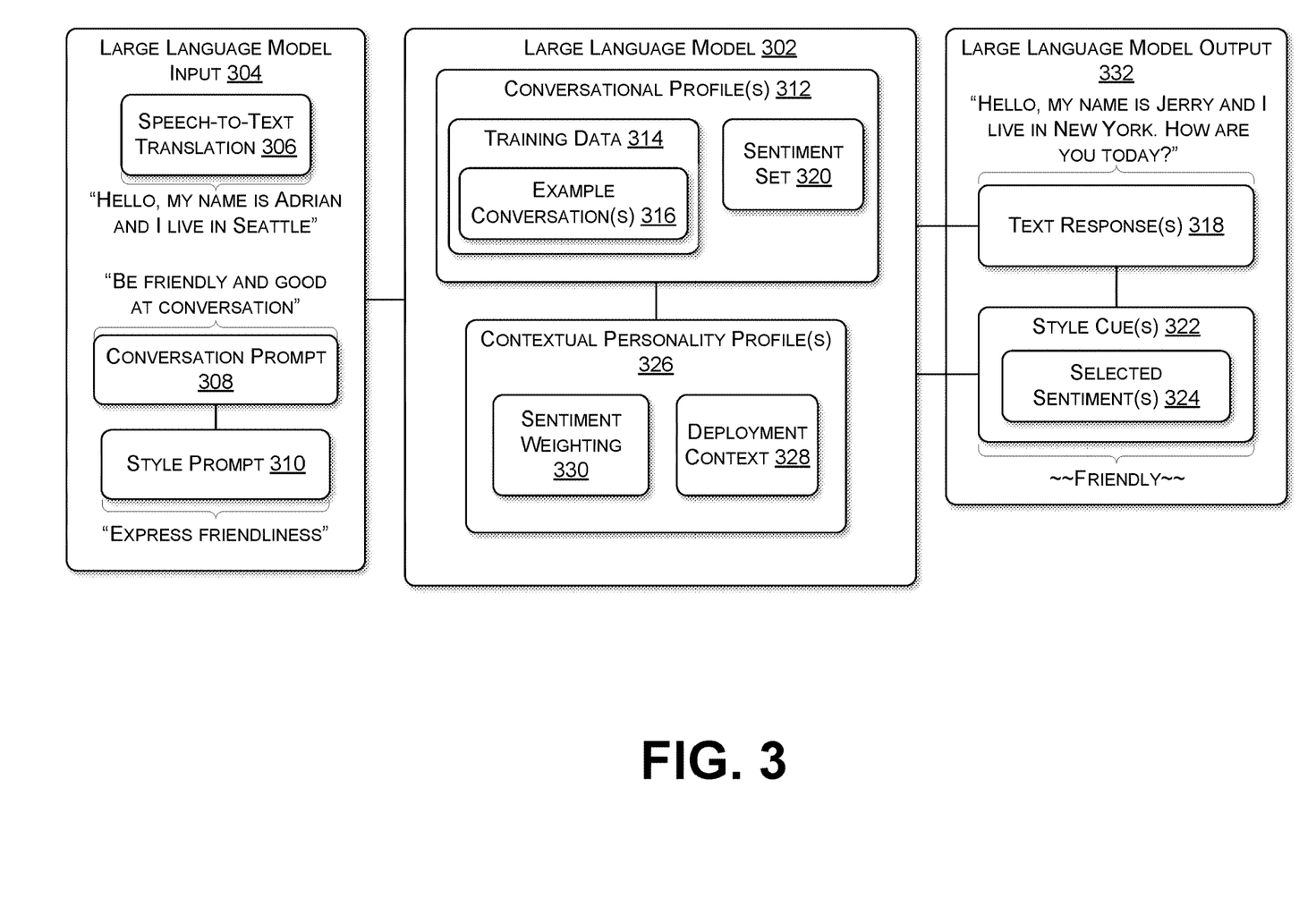
FIG. 3 illustrates a large language responding to a user input according to a conversation prompt and style prompt.

Proceeding now to FIG. 3, aspects of a large language model 302 that is configured to respond to a large language model input 304 are shown and described. As discussed above, the large language model input 304 can include a speech-to-text translation 306 of a speech audio user input. In addition, the large language model input 304 can include a conversation prompt 308 as well as a style prompt 310 generated by a prompt engine 202. The conversation prompt 308 and the style prompt 310 can configure the large language model 302 with an expected behavior with which to respond to the speech-to-text translation 306.

Furthermore, the large language model 302 can be configured with a conversational profile 312 which can enable the large language model 302 to not only respond to individual inputs but rather carry on a conversation in which context can persist and change over time. Consequently, what constitutes an appropriate response can be nebulous and depend heavily on implications of previous statements, the current mood, and other indefinite factors. In this way, the technical benefits of a large language model 302 can be uniquely suited for real-time conversational human-computer interaction. Unlike many artificial intelligence implementations, the large language model 302 can identify and operate within vague and/or poorly defined contexts. As such, the large language model 302 can appropriately respond to user inputs while accounting for conversational history, mood, and other context clues.

Accordingly, the conversational profile 312 of the large language model 302 can include training data 314 comprising a plurality of example conversations 316 which can be analyzed by the large language model 302 to learn various conversational contexts and how to appropriate respond to a given input. From the known outcomes of the training data 314, the large language model 302 can subsequently receive and respond to unfamiliar inputs (e.g., in a live deployment environment). In various examples, the example conversations 316 can comprise a large corpus of labeled data demonstrating positive interactions, negative interactions, appropriate and inappropriate responses in certain contexts, and so forth.

Based on the training data 314, the large language model 302 can generate a text response 318 to the speech-to-text translation 306 in accordance with the conversation prompt 308 and/or the style prompt 310. In a specific example, the speech-to-text translation 306 can state "hello, my name is Adrian and I live in Seattle." Meanwhile, the conversation prompt 308 can instruct the large language model 302 to "be friendly and good at conversation" and the style prompt 310 can instruct the large language model 302 to "express friendliness." Accordingly, the large language model 302 can generate a text response 318 that states "hello, my name is Jerry and I live in New York. How are you today?" to reply to the speech-to-text translation 306.

The word selection and phrasing of the text response 318 can be determined by the large language model 302 based on a context derived from the speech-to-text translation 306 in combination with the instructions of the conversation prompt 308 and/or the style prompt 310. For example, in response to a user introducing themselves with their name and place of residence, the large language model 302 can respond in kind with a name and place of residence. Moreover, to be "good at conversation" as defined by the conversation prompt 308, the large language model 302 can additionally ask a question in the text response 318 to continue the conversation.

To enrich the experience of conversation with the large language model 302, the conversation profile 312 can be additionally configured with a sentiment set 320. The sentiment set 320 can define a set of attitudes (e.g., friendly, confused, annoyed, excited) that the large language model 302 can utilize to express emotion according to the style prompt 310. For example, the style prompt 310 can configure the large language model 302 to "express friendliness." Accordingly, the large language model 302 can generate a style cue 322 with a selected sentiment 324 expressing a "~~friendly~~" sentiment which can be appended to the text response 318. In addition, the style cue 322 can contain a plurality of selected sentiments 324 to express a multifaceted emotion. As will be described below, the style cue 322 and/or the selected sentiment 324 can be formatted such that the style cue 322 and/or the selected sentiment 324 are not processed as text within an audio output. That is, the audio output will not speak the style cue 322 and/or the selected sentiment 324.

In addition to the style prompt 310, the large language model 302 can be configured with a contextual personality profile 326. The contextual personality profile 326 can constrain aspects of how the large language model 302 expresses various attitudes via the sentiment set 320. In various examples, the contextual personality profile 326 can define a deployment context 328 for the large language model 302. For instance, the large language model 302 may be deployed in a customer service context. Naturally, it would be inappropriate to express anger or annoyance in a customer service context. As such, the contextual personality profile 326 can apply a sentiment weighting 330 to the sentiment set 320 to restrict undesirable or inappropriate sentiments.

In another example, a provider of the large language model 302 may simply wish to design various personalities for users to interact with. By customizing the sentiment weighting 330, the contextual personality profile 326 can bias the sentiment set 320 towards various character traits (e.g., kind, sarcastic, naïve). Stated another way, the large language model 302 can be configured to play different characters by utilizing a plurality of contextual personality profiles 326 each having a different a sentiment weighting 330 6 such that style cues 322 and constituent selected sentiments 324 can consistently conform to expected behavior irrespective of external factors (e.g., a rude user). Accordingly, the large language model 302 can package a text response 318 and style cue 322 as a large language model output 332.

Figure 4:
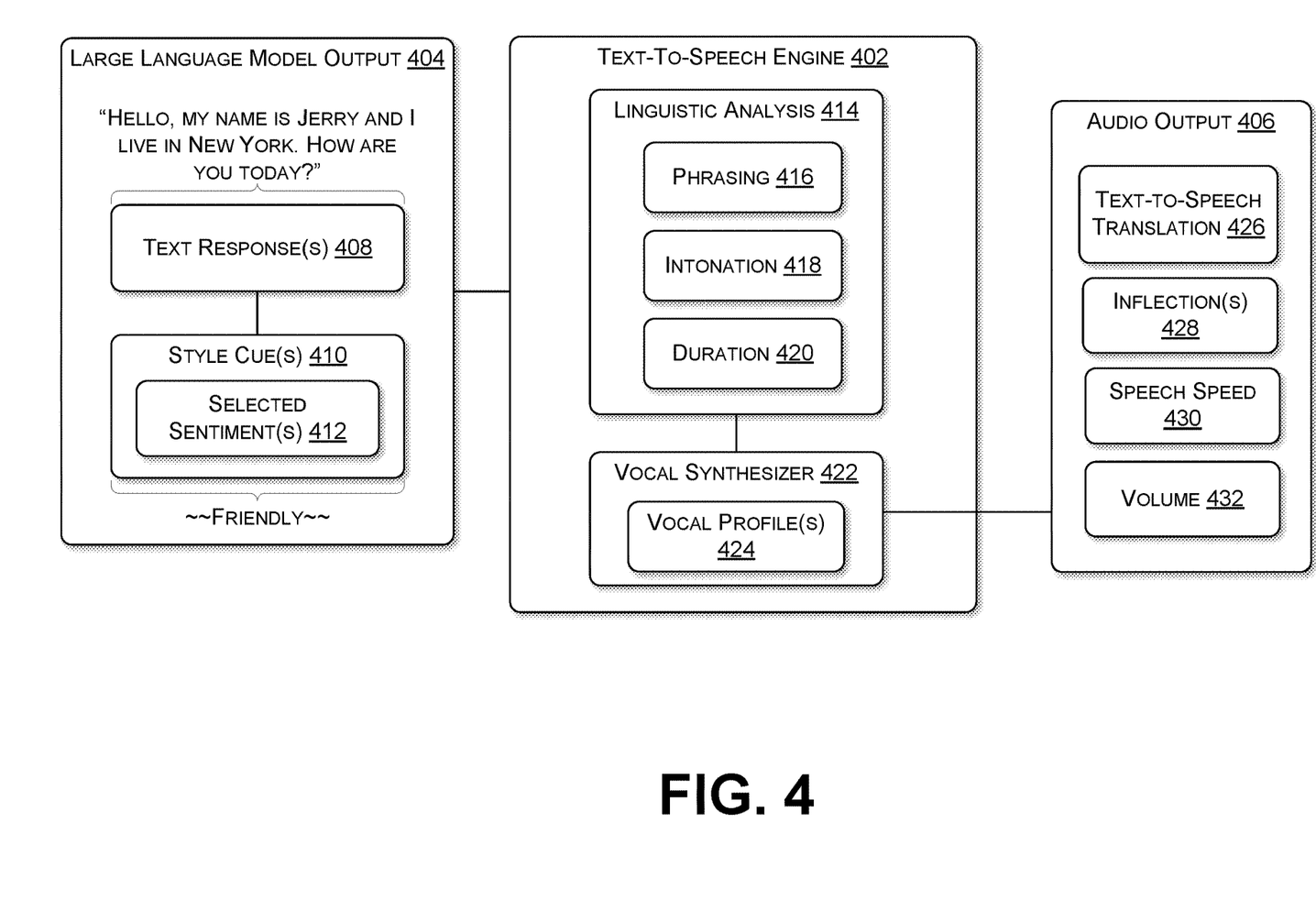
FIG. 4 illustrates a text-to-speech engine processing a large language output to generate an audio output with realistic inflection to express an emotion.

Turning now to FIG. 4, aspects of a text-to-speech engine 402 that can process a large language model output 404 to generate an audio output 406 are shown and described. As shown, the text-to-speech engine 402 can receive a large language model output 404 that can include a text response 408 and a style cue 410 that can define various selected sentiments 412. In a specific example, the text response 408 can be a reply to a user input (e.g., audio input 110) generated by a large language model. Similarly, the style cue 410 can be generated by the large language model to augment the text response 408 with one or more selected sentiments 412 to express various emotions (e.g., friendly, inquisitive).

Accordingly, the text-to-speech engine 402 can perform a linguistic analysis 414 of the large language model output 404 to translate the written word of the text response 408 and the style cue 410 into speech. In a specific example, the punctuation and word selection of the text response 408 can affect the phrasing 416 determined by the text-to speech engine 402 such as pausing after a comma with a comparatively longer pause after a period. Similarly, the linguistic analysis 414 can also include an intonation 418 defining the natural rising and falling of the voice when speaking which can also be referred to as inflection. For instance, a question mark in the text response 408 can cause the intonation 418 to rise to indicate a question. In another example, the linguistic analysis 414 may include a duration 420 defining a length of time for each word of the text response 408 (e.g., lengthening and shortening words). In this way, the text-to-speech engine 402 can apply a phrasing 416, intonation 418, and duration 420 to words and phrases to generate lifelike speech thereby enhancing engagement.

In addition, the text-to-speech engine 402 can also take the style cues 410 and selected sentiments 412 into account when performing the linguistic analysis 414. For instance, the style cue 410 can define a "~~friendly~~" selected sentiment 412. To accordingly express a friendly tone of voice, the linguistic analysis 414 can adjust one or a combination of the phrasing 416, the intonation 418, and the duration 420. For example, a "~~friendly~~" selected sentiment 412 may result in more dramatic fluctuations in the intonation 418 as opposed to a "~~bored~~" selected sentiment 412.

The text-to-speech engine 402 can subsequently configure a vocal synthesizer 422 with the phrasing 416, the intonation 418, and/or the duration 420 determined in the linguistic analysis 414. In various examples, the vocal synthesizer 422 can also be configured with a vocal profile 424 defining characteristics of the voice of the text-to-speech engine 402. For instance, the vocal profile 424 can define a gender of the voice (e.g., a feminine voice, a masculine voice) which can affect the pitch of speech. In another example, the vocal profile 424 can define an accent (e.g., a British accent) which can affect the pronunciation of various words. Moreover, selection and configuration of the vocal profile 424 can be informed by the contextual personality profile 326 discussed above. In a specific example, if the large language model is deployed in a customer support context, the vocal synthesizer 422 can be configured with a vocal profile 424 that is appropriate for the deployment context.

Using the linguistic analysis 414 and the vocal synthesizer 422, the text-to-speech engine 402 can translate the text response 408 into an audio output 406 (e.g., an audio waveform). The audio output 406 can include a text-to-speech translation 426 of the text response 408. That is, the text-to-speech 426 can be a reading of the words of the text response 408 (e.g., "Hello, my name is Jerry and I live in New York. How are you today?"). The style cue 410 can be formatted such that the style cue 410 is not spoken by the text-to-speech engine 402 as part of the text-to-speech translation 426 despite being appended to the text response 408.

The audio output 406 may also include inflections 428 that can be generated by the text-to-speech engine 402 based on the style cue 410 to express the selected sentiments 412. Stated another way, the inflections 428 can be an auditory translation of the intonation 418 determined in the linguistic analysis 414. For instance, a friendly selected sentiment 412 can cause the vocal synthesizer 422 to generate a first set of inflections 428 while a concerned selected sentiment 412 can cause the vocal synthesizer 422 to generate a second set of inflections 428. Furthermore, combinations of several selected sentiments 412 can further augment the inflections 428 of the audio output 406.

Likewise, the vocal synthesizer 422 can generate a speech speed 430 and a volume 432 for the audio output 406. The speech speed 430 can define the speed at which the text-to-speech translation 426 is read out. That is, the speech speed 430 can be a translation of the phrasing 416 and the duration 420 of the linguistic analysis 414. In addition, the volume 432 can define the loudness of the audio output 406 and can also affect the tone of the audio output 406. For instance, a whisper audio output 406 can have a lower volume 432 compared to the a shout audio output 406. As such, the volume 432 can be determined based on the linguistic analysis 414 derived from the style cue 410.

Figure 5:
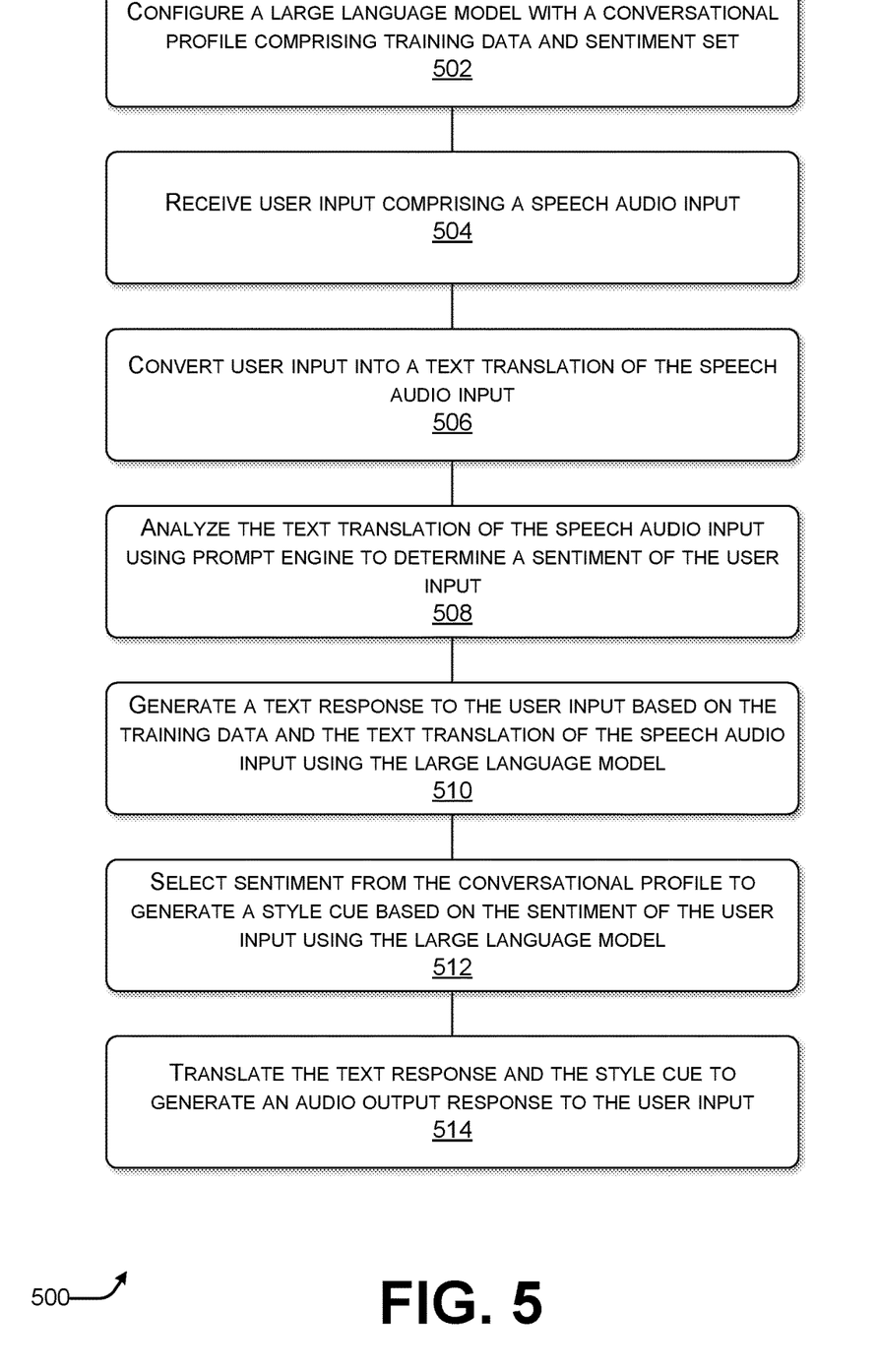
FIG. 5 is a flow diagram showing aspects of a routine for carrying out a real-time spoken natural stylistic conversation with a large language model.

Turning now to FIG. 5, aspects of a routine 500 for enabling spoken natural stylistic conversations with large language models is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 200 may be also implemented in many other ways. For example, the routine 200 may be implemented, at least in part, by a processor of another remote computer or a local circuit. In addition, one or more of the operations of the routine 200 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 502 where a system configures a large language model with a conversational profile comprising training data and a sentiment set. For example, the training data can include example conversations and other parameters to establish a pattern for the large language model to follow when engaged in a conversation. In addition, the sentiment set enables the large language model to select an emotion to express when responding to a user input.

Next, at operation 504, after configuring the large language model, the system receives a user input in the form of a speech audio input.

Then, at operation 506, the user input is converted into a text translation of the speech audio input. This can be accomplished using any suitable speech-to-text engine, natural language processor, and the like. In addition, the translation can occur at predetermined intervals as well as dynamically such as when the user pauses or stops speaking.

Next, at operation 508, the text translation of the speech audio input is analyzed by a prompt engine to determine a sentiment of the user input. This can be based on various factors such as word choice. In addition, the speech audio input itself can be analyzed to determine inflection in the user's speaking voice, speaking volume, and so forth which can affect sentiment.

Subsequently, at operation 510, the large language model generates a text response to the user input based on the training data and text translation of the speech audio input. As mentioned, the training data serves to establish a pattern which the large language model emulates and develops over time. In this way, the large language model can maintain a realistic conversational context to improve immersion.

Then, at operation 512, the large language model selects a sentiment from the sentiment set in the conversation profile to generate a style cue based on the sentiment of the user input. This selection can also take various factors into consideration such as the pattern established by the training data, previous conversations, the subject of the conversation, and so forth.

Finally, at operation 514, the system translates the text response and the style cue to generate an audio output response to the user input. This can be accomplished using a text-to-speech engine which accordingly reads out the text response while also interpreting the style cue to inflect and accurately express the sentiment selected by the large language model.

Figure 6:
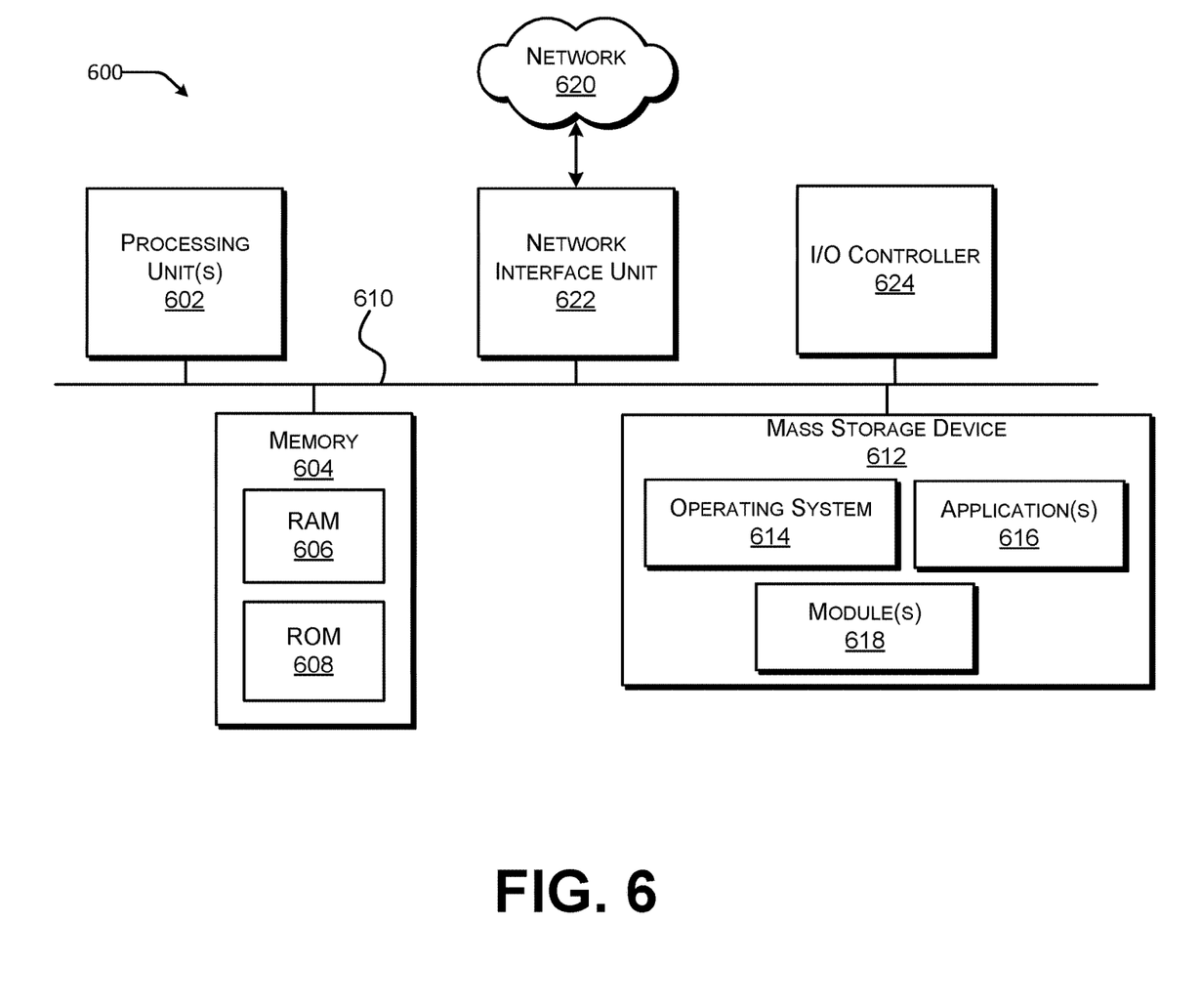
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
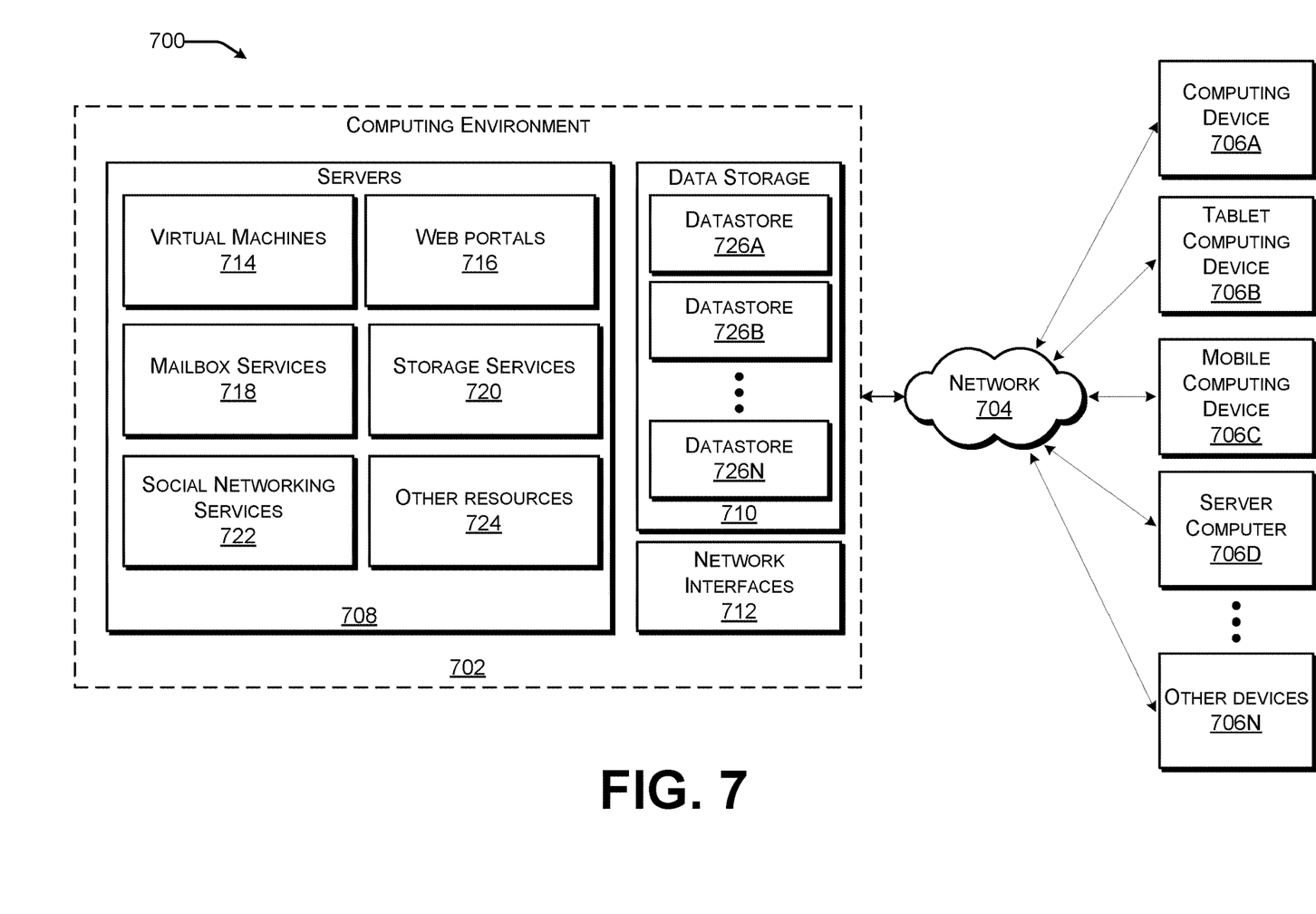
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different audio inputs).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
configuring a large language model with a conversational profile comprising training data that includes a set of example conversations that comprise labeled data demonstrating positive interactions, negative interactions, and appropriate responses and inappropriate responses, and a set of sentiments;
receiving a user input comprising a speech audio input;
converting the user input into a text translation of the speech audio input;
analyzing the speech audio input to determine at least one of a volume, a tone of voice, and one or more inflections of a voice included in the speech audio input;
analyzing at least one of the volume, the tone of voice, and the one or more inflections with the text translation of the speech audio input using a prompt engine to determine a sentiment of the user input;
generating a prompt, using the prompt engine, wherein the prompt includes the sentiment of the user input that is determined using at least one of the tone, the volume, the one or more inflections, and the text translation of the speech audio input, the prompt further comprising instructions for causing the large language model to include punctuation and a word selection in a text response that represents a selected sentiment from the set of sentiments within the conversational profile;
causing the large language model to generate the text response based on the prompt and the text translation of the speech audio input, using the selected sentiment and the training data, wherein the training data causes the large language model to set patterns for subsequent text responses and prompts by increasing emphasis for positive user interactions and appropriate text responses and decreasing emphasis for negative user interactions and inappropriate text responses;
receiving the text response with the selected sentiment from the large language model generated from the prompt;
selecting a style cue for an audio output based on the sentiment of the user input, the selected sentiment of the text response, and the prompt using the large language model; and
generating the audio output using the text response and the style cue, wherein the audio output response uses the style cue, the punctuation, and the world selection from the text response to generate the audio output including at least one of an audio output volume, an audio output tone of voice, or one or more inflections of a voice in the audio output, wherein at least one of the audio output volume, the audio output tone of voice, or one or more inflections of the voice in the audio output corresponds to the style cue, the punctuation, and the word selection of the text response.

2. The method of claim 1, wherein the conversational profile defines a personality profile emphasizing one or more sentiments of the set of sentiments.

3. The method of claim 1, wherein the text response comprises a word selection that is selected based on the sentiment of the user input.

4. The method of claim 1, wherein:
the text response includes one or more punctuation markings; and the style cue is generated based on the one or more punctuation markings of the text response.

5. The method of claim 1, wherein:
the sentiment that is selected from the conversational profile is appended to the text response; and
the text response is processed by a text to speech engine to generate the audio output response.

6. The method of claim 5, wherein the sentiment that is appended to the text response is processed by a text-to-speech engine such that the sentiment is not spoken in the audio output response.

7. A system comprising:
a processing unit; and
a computer readable medium having encoded thereon computer-readable instructions that when executed by the processing unit cause the system to:
configure a large language model with a conversational profile comprising training data that includes a set of example conversations that comprise labeled data demonstrating positive interactions, negative interactions, and appropriate responses and inappropriate responses, and a set of sentiments;
receive a user input comprising a speech audio input;
convert the user input into a text translation of the speech audio input;
analyze the speech audio input to determine at least one of a volume, a tone of voice, and one or more inflections of a voice included in the speech audio input;
analyze at least one of the volume, the tone of voice, and the one or more inflections with the text translation of the speech audio input using a prompt engine to determine a sentiment of the user input;
generate a prompt, use the prompt engine, wherein the prompt includes the sentiment of the user input that is determined using at least one of the tone, the volume, the one or more inflections, and the text translation of the speech audio input, the prompt further comprising instructions for causing the large language model to include punctuation and a word selection in a text response that represents a selected sentiment from the set of sentiments within the conversational profile;
cause the large language model to generate the text response based on the prompt and the text translation of the speech audio input, using the selected sentiment and the training data, wherein the training data causes the large language model to set patterns for subsequent text responses and prompts by increasing emphasis for positive user interactions and appropriate text responses and decreasing emphasis for negative user interactions and inappropriate text responses;
receive the text response with the selected sentiment from the large language model generated from the prompt;
select a style cue for an audio output based on the sentiment of the user input, the selected sentiment of the text response, and the prompt using the large language model; and
generate the audio output using the text response and the style cue, wherein the audio output response uses the style cue, the punctuation, and the world selection from the text response to generate the audio output including at least one of an audio output volume, an audio output tone of voice, or one or more inflections of a voice in the audio output, wherein at least one of the audio output volume, the audio output tone of voice, or one or more inflections of the voice in the audio output corresponds to the style cue, the punctuation, and the word selection of the text response.

8. The system of claim 7, wherein the conversational profile defines a personality profile emphasizing one or more sentiments of the set of sentiments.

9. The system of claim 7, wherein the text response comprises a word selection that is selected based on the sentiment of the user input.

10. The system of claim 7, wherein:
the text response includes one or more punctuation markings; and
the style cue is generated based on the one or more punctuation markings of the text response.

11. The system of claim 7, wherein:
the sentiment that is selected from the conversational profile is appended to the text response; and
the text response is processed by a text to speech engine to generate the audio output response.

12. The system of claim 11, wherein the sentiment that is appended to the text response is processed by a text-to-speech engine such that the sentiment is not spoken in the audio output response.

13. A storage device having encoded thereon computer readable instructions that when executed by a system cause the system to:
configure a large language model with a conversational profile comprising training data that includes a set of example conversations that comprise labeled data demonstrating positive interactions, negative interactions, and appropriate responses and inappropriate responses, and a set of sentiments;
receive a user input comprising a speech audio input;
convert the user input into a text translation of the speech audio input;
analyze the speech audio input to determine at least one of a volume, a tone of voice, and one or more inflections of a voice included in the speech audio input;
analyze at least one of the volume, the tone of voice, and the one or more inflections with the text translation of the speech audio input using a prompt engine to determine a sentiment of the user input;
generate a prompt, use the prompt engine, wherein the prompt includes the sentiment of the user input that is determined using at least one of the tone, the volume, the one or more inflections, and the text translation of the speech audio input, the prompt further comprising instructions to cause the large language model to include punctuation and a word selection in a text response that represents a selected sentiment from the set of sentiments within the conversational profile;
cause the large language model to generate the text response based on the prompt and the text translation of the speech audio input, using the selected sentiment and the training data, wherein the training data causes the large language model to set patterns for subsequent text responses and prompts by increasing emphasis for positive user interactions and appropriate text responses and decreasing emphasis for negative user interactions and inappropriate text responses;
receive the text response with the selected sentiment from the large language model generated from the prompt;
select a style cue for an audio output based on the sentiment of the user input, the selected sentiment of the text response, and the prompt using the large language model; and
generate the audio output using the text response and the style cue, wherein the audio output response uses the style cue, the punctuation, and the world selection from the text response to generate the audio output including at least one of an audio output volume, an audio output tone of voice, or one or more inflections of a voice in the audio output, wherein at least one of the audio output volume, the audio output tone of voice, or one or more inflections of the voice in the audio output corresponds to the style cue, the punctuation, and the word selection of the text response.

14. The storage device of claim 13, wherein the conversational profile defines a personality profile emphasizing one or more sentiments of the set of sentiments.

15. The storage device of claim 13, wherein the text response comprises a word selection that is selected based on the sentiment of the user input.

16. The storage device of claim 13,
wherein: the text response includes one or more punctuation markings; and
the style cue is generated based on the one or more punctuation markings of the text response.

17. The storage device of claim 13, wherein text response is processed by a text-to-speech engine such that the sentiment is not spoken in the audio output response.

18. The method of claim 1, wherein, the large language model is an auto-regressive model that predicts the next word in a sequence.

19. The method of claim 1, wherein, the style cue for the audio output response comprises multiple selected sentiments enabling multifaceted emotion responses.

20. The method of claim 2, wherein, the personality profile is configured to constrain the set of sentiments to exclude inappropriate sentiments.

* * * * *